(12) United States Patent
Chang et al.

(10) Patent No.: US 8,623,141 B2
(45) Date of Patent: Jan. 7, 2014

(54) PIPING SYSTEM AND CONTROL FOR SEMICONDUCTOR PROCESSING

(75) Inventors: Yi-Pin Chang, Hsinchu County (TW); Chyi Shyuan Chern, Taipei (TW)

(73) Assignee: Taiwan Semiconductor Manufacturing Co., Ltd., Hsin-chu (TW)

( * ) Notice: Subject to any disclaimer, the term of this patent is extended or adjusted under 35 U.S.C. 154(b) by 1233 days.

(21) Appl. No.: 12/467,375

(22) Filed: May 18, 2009

(65) Prior Publication Data

US 2010/0288369 A1     Nov. 18, 2010

(51) Int. Cl.
*C23C 16/00* (2006.01)
*G05D 16/20* (2006.01)
*F15C 3/00* (2006.01)
*C23F 1/00* (2006.01)

(52) U.S. Cl.
USPC ...... 118/719; 118/683; 118/684; 156/345.29; 137/565.23; 137/606

(58) Field of Classification Search
USPC ............. 118/683, 684; 137/565.23, 606
See application file for complete search history.

(56) References Cited

U.S. PATENT DOCUMENTS

| | | | | |
|---|---|---|---|---|
| 5,575,853 | A * | 11/1996 | Arami et al. | 118/708 |
| 6,071,350 | A * | 6/2000 | Jeon et al. | 118/719 |
| 6,382,249 | B1 | 5/2002 | Kawasaki et al. | |
| 6,576,061 | B1 * | 6/2003 | Moriyama et al. | 118/719 |
| 7,491,292 | B2 | 2/2009 | Han et al. | |
| 2010/0212588 | A1 * | 8/2010 | Suda et al. | 118/663 |

FOREIGN PATENT DOCUMENTS

| | | |
|---|---|---|
| EP | 1017085 A2 | 5/2000 |
| EP | 1077329 A1 | 2/2001 |
| JP | 0917736 A | 1/1997 |
| JP | 2000024483 A | 1/2000 |
| JP | 2008144766 A | 6/2008 |
| KR | 20020024627 A | 4/2002 |
| KR | 20040107985 A | 12/2004 |
| KR | 20080047786 A | 5/2008 |
| WO | WO 2009/016911 | * 2/2009 |

OTHER PUBLICATIONS

Dan Goodman and Shaun Pewsey of Millipore Corporation, Allen, TX. Article: Etch ande CVD process improvements via heated vacuum throttle valves. Internet Magazine: Solid State Technology. Date: Dec. 2000. http://www.solid-state.com/display_article/87675/5/none/none/Feat/-Etch-and-CVD-process. USA.

(Continued)

*Primary Examiner* — Parviz Hassanzadeh
*Assistant Examiner* — Nathan K Ford
(74) *Attorney, Agent, or Firm* — Duane Morris LLP

(57) ABSTRACT

A vacuum system for semiconductor fabrication. The system includes a vacuum chamber for performing a semiconductor fabrication process, a vacuum source, and a piping system fluidly connecting the vacuum chamber to the vacuum source. In one embodiment, the piping system is configured without a horizontal flow path section of piping. In some embodiments, the piping system includes a first piping branch and a second piping branch. The first and second piping branches preferably have a symmetrical configuration with respect to the vacuum source. In yet other embodiments, the first and second piping branches preferably each include a throttle valve.

10 Claims, 5 Drawing Sheets

(56) References Cited

OTHER PUBLICATIONS

Stuart Tison of Mykrolis Corp., Allen, TX. Article: Chamber matching and on-tool MFC adjustment achieve process repeatability. Internet Magazine: Solid State Technology. Date: May 2005. http://www.solid-state.com/display_article/227445/5/none/none/Feat/Chamber-matching-an. USA.

Office Action dated Apr. 22, 2013 in related Chinese Application No. 099115768.

* cited by examiner

PIPING SYSTEM AND CONTROL FOR SEMICONDUCTOR PROCESSING

FIELD OF THE INVENTION

The present invention generally relates to semiconductors, and more particularly to piping systems associated with wafer processing machines or tools.

BACKGROUND

Modern semiconductor electronic device packages such as integrated circuit (IC) chips are typically formed by building multiple layers of materials and components on a semiconductor substrate. A single wafer will contain a plurality of individual ICs or dies, which are later separated following fabrication by a cutting process referred to in the art as singulation or dicing. The semiconductor devices incorporate numerous electrically active components which are formed in multiple layers of an electrically insulating or dielectric material. Metal conductors or interconnects are formed in the dielectric material by various additive patterning and deposition processes (e.g. damascene and dual damascene) to electrically couple active components together in the different layers and/or within a single layer. Modern semiconductor fabrication, accordingly, entails a repetitive sequence of numerous process steps including material deposition (conductive metals and non-conductive materials), photolithographic patterning of circuits in the deposited material, and selective material removal such as etching and ashing to gradually build the semiconductor device structures.

Some of the foregoing semiconductor fabrication processes are performed in commercially-available vacuum processing tools or machines. These semiconductor processing machines include a heated vacuum process chamber that holds one or more wafers and a vacuum source fluidly connected to chamber. These semiconductor fabrication tools generally further include a gas supply system for introducing reactant process gases to the chamber that may be used for conventional etching/ashing processes which remove semiconductor materials from the wafer or vapor deposition processes (e.g. CVD, PVD, etc.) which add layers of thin films or materials to the wafer. The vacuum source reduces the pressure in the process chamber and exhausts or draws gases from the chamber to establish flow from the chamber to the vacuum sources. The vacuum source for the process chamber is typically provided by a vacuum pump that is fluidly connected to the process chamber via vacuum exhaust piping and valving.

FIG. 1 shows an example of one known conventional vacuum processing machine or system 10 and vacuum piping arrangement. Processing system 10 includes a vacuum process chamber 11, gas supply system 13, vacuum pump 14, vacuum pumping piping 15 from process chamber 11 to vacuum pump 14, and single combination pressure control and isolation valve 14. Process chamber 11 holds one or more wafers W supported by base 12. The vacuum pumping piping 15 shown has four inlets 19 which are coupled to pumping ports in vacuum process chamber 11 located proximate to each wafer W. The desired vacuum pressure in process chamber 11 is maintained by measuring the actual chamber pressure P via a pressure gauge or sensor 17 and sending a corresponding digital or analog pressure signal to a pressure controller 18. The pressure controller 18 compares the actual chamber pressure P to a predetermined desired chamber setpoint pressure Ps. If the variance between actual and setpoint pressures exceed a predetermined threshold limit, the controller 18 sends a signal to throttle the pressure control-isolation valve 14 until the actual chamber pressure P is brought back into the desired pressure range.

The foregoing conventional vacuum processing systems, however, are prone to a number of problems. The asymmetric vacuum pumping piping 15 arrangement and multiple piping branches may result in unbalanced vacuum pressures in each branch and/or piping inlets 19 and corresponding portions of the process chamber 11. This in turn may lead to an uneven gas flow pattern through the process chamber causing non-uniform material removal or deposition either on a single wafer or wafer-to-wafer leading to higher than normal die reject rates. Although these effects may be less pronounced when processing 300 mm or smaller wafers, the flow and pressure imbalance becomes a more significant problem for processing the larger next generation 450 mm size wafers. Furthermore, the multiple branches and complex configuration of the vacuum pumping piping 15 increases flow resistance resulting in lower pumping efficiency and higher operating costs.

Another problem with the foregoing known vacuum processing systems 10 is the accumulation or buildup of solid process byproducts (e.g. powders, residues, particles, etc.) in the vacuum pumping piping 15 that carry over from the semiconductor material removal or deposition processes performed in vacuum chamber 11. The particulate byproduct buildup reduces the effective internal diameter of the vacuum piping, raises back pressure on the vacuum chamber 11, and decreases gas flow leading to higher byproduct accumulation rates in the piping. The decreased internal piping diameter increases flow resistance and decreases pumping efficiency as well. In addition, the particulate byproduct accumulations further exacerbate the pressure balance problems and uneven gas flow in the process chamber mentioned above that leads to non-uniform wafer material removal and deposition. Frequent periodic maintenance and downtime of the vacuum process machine is required to disassemble the vacuum pumping piping 15 and remove particulate byproduct buildups.

Existing piping arrangements having numerous horizontal piping sections such as the vacuum pumping piping 15 shown in FIG. 1 are particularly susceptible to increased buildup of semiconductor fabrication process particulate byproducts. The horizontal sections of existing pumping piping arrangements act as ledges or traps for particulate matter to accumulate, and is particularly pronounced near the piping inlets 19 beneath the pumping ports on process chamber 11 as shown in FIG. 2. The flow eddies and stagnant flow regions caused by the many piping bends, particularly 90 degree elbows, also create low flow regions where particulate byproduct buildup tends to occur.

Yet another problem with the foregoing known vacuum processing systems 10 is inability to compensate for the uneven gas flow due to vacuum pressure imbalances in the vacuum pumping piping 15 resulting from the asymmetrical piping arrangement and particulate byproduct buildup in the piping. Only a single pressure measurement of the process chamber actual pressure P is recorded giving the controller and/or process operating personnel no information on whether one of the piping branches may have partial blockages due to particulate byproduct buildup causing the uneven gas flow. Furthermore, because only a single combined pressure control-isolation valve 14 is provided, the controller or operator has no real ability to balance the gas flow and pressures from side to side in the piping branches to compensate for excessive buildup occurring in one of the branches. Therefore, the entire processing machine must be shut down for maintenance to clean out the particulate buildup.

An improved vacuum processing machine piping arrangement and pressure monitoring and control system is therefore desired.

SUMMARY

According to another embodiment, a vacuum system for semiconductor fabrication includes a vacuum chamber for performing a semiconductor fabrication process, a vacuum source, and a piping system fluidly connecting the vacuum chamber to the vacuum source. Preferably, the piping system is configured without a horizontal flow path section of piping. In one embodiment, the piping system includes a first piping branch and a second piping branch in which the first and second piping branches having a symmetrical configuration with respect to the vacuum source. The first and second piping branches preferably have substantially the same configuration in some embodiments. In some embodiments, each piping branch includes a bifurcated fitting that is fluidly connected to the vacuum chamber. In preferred embodiments of the piping system, the first and second piping branches each include a throttle valve that is independently controllable and operable to adjust the pressure and gas flow in each branch.

According to another embodiment, a vacuum control system for a semiconductor fabrication machine includes a vacuum chamber for performing a semiconductor fabrication process which includes a chamber pressure sensor operable to measure pressure within the chamber and transmit a signal indicative of the measured chamber pressure and a vacuum source, such as a vacuum pump in some embodiments. The system further preferably includes a first piping branch fluidly connected to the vacuum chamber that includes a first throttle valve. The first piping branch includes a first pressure sensor operable to measure pressure within the first piping branch and transmit a signal indicative of the measured first branch pressure. A second piping branch fluidly connecting the vacuum chamber is provided that includes a second throttle valve. The second piping branch includes a second pressure sensor operable to measure pressure within the second piping branch and transmit a signal indicative of the measured second branch pressure. In preferred embodiments, the first and second piping branches converge and are fluidly connected to the vacuum source.

In some embodiments, a system controller is provided that receives pressure signals from the foregoing chamber pressure sensor, first piping branch pressure sensor, and second piping branch pressure sensor. The controller is preprogrammed with and operative to executes control logic configured to: compare the measured pressure from the first and second piping branch pressure sensors; and throttle the first or second throttle valves to balance the pressure in each piping branch. In other embodiments, the control logic is further configured to sense the operating position of the first and second throttle valves, compare the positions of the first and second valve to a control limit, and stop the fabrication machine if the positions of the first or second control valve exceed the control limit. The positions of valves relate to the degree of openness of the variable flow orifices that are preferably provided in each of the first and second throttle valves. In some embodiments, the control logic is further configured to compare the chamber pressure to the first branch pressure and second branch pressure, and stop the fabrication machine if the first or second branch pressure is not equal to the chamber pressure. In yet other embodiments, the control logic may be stored on computer readable medium accessible to the system controller.

A method for controlling a vacuum system for a semiconductor fabrication machine is provided. The method includes providing a vacuum chamber, a vacuum source, and a piping system fluidly connecting the vacuum chamber to the vacuum source. The method further includes measuring pressures in a first and second piping branch of the piping system, comparing the measured pressures in the first and second piping branches, and adjusting the pressure in the first or second piping branch. In one embodiment, the adjusting step includes throttling at least one of a first throttle valve in the first branch and a second throttle valve in the second piping branch. In another embodiment, the method further includes determining the position of the first and second throttle valves and comparing the positions to a predetermined control limit. The method may further include stopping the fabrication machine if the position of the first or second throttle valves exceeds the control limit. In other embodiments, the method includes comparing the measured pressures in the first and second piping branches to a pressure measured in the vacuum chamber, and optionally stopping the fabrication machine if the measured pressures in the first or second piping branches do not equal the vacuum chamber pressure. In a preferred embodiment, the foregoing method steps are automatically performed by a micro-processor based system controller having an associated computer readable medium on which control logic implemented by the controller may be stored which is configured to perform the method steps.

BRIEF DESCRIPTION OF THE DRAWINGS

The features of the preferred embodiments will be described with reference to the following drawings where like elements are labeled similarly, and in which.

Figure 1:
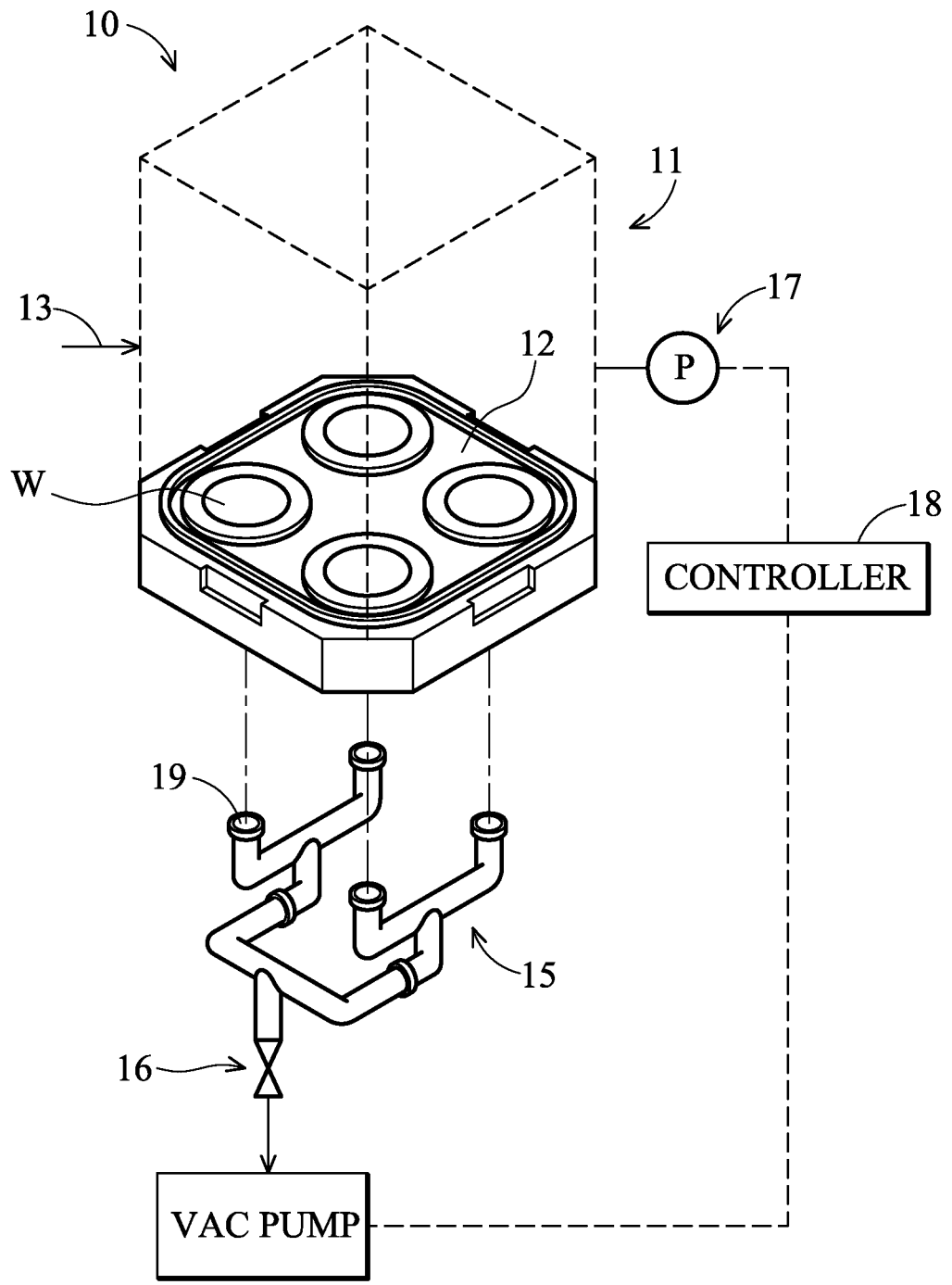
FIG. 1 is a perspective view showing a conventional semiconductor vacuum processing system and piping arrangement.

All drawings are schematic and are not drawn to scale.

DETAILED DESCRIPTION

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Figure 3:
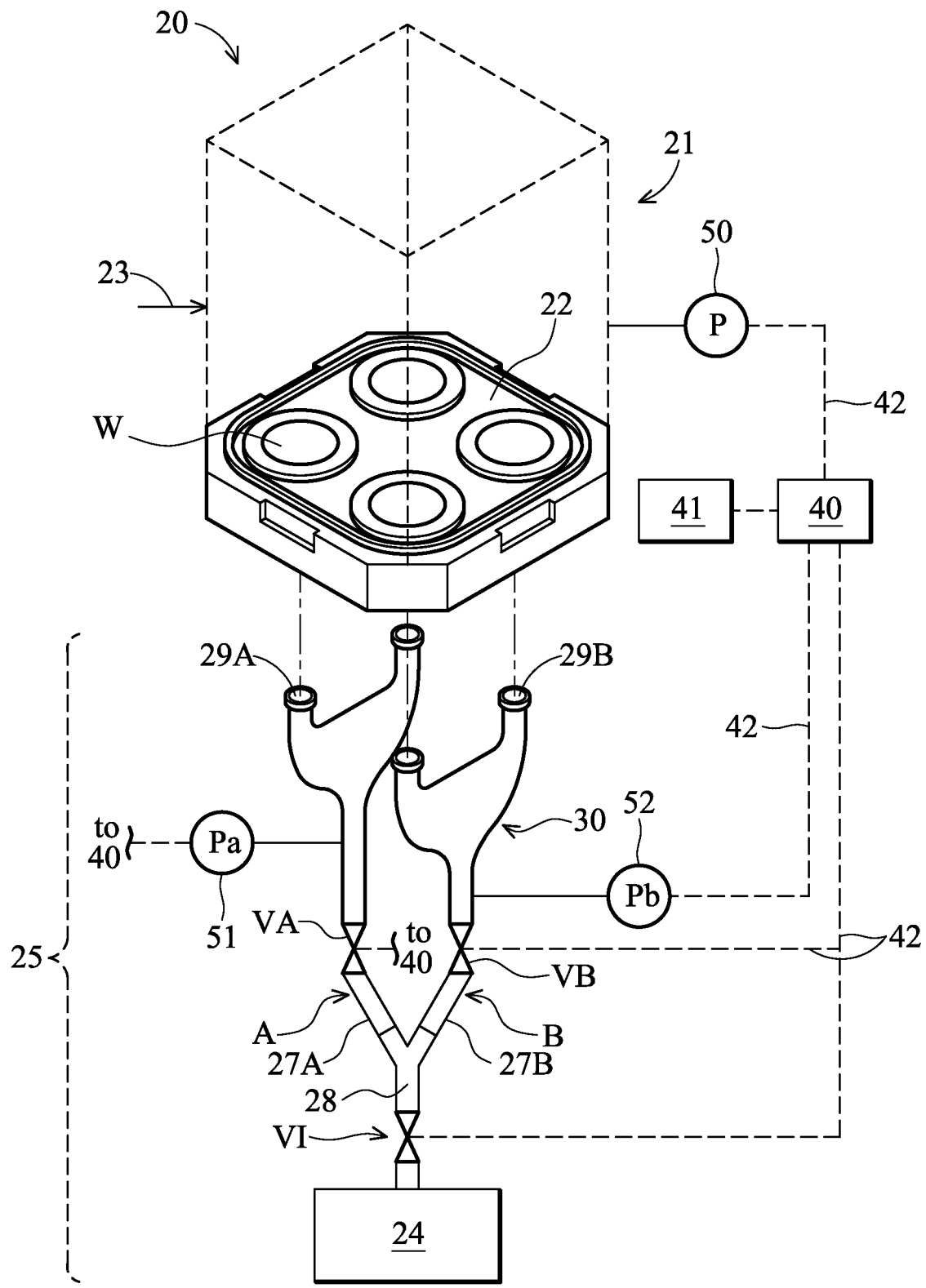
FIG. 3 is a perspective view showing one embodiment of a semiconductor vacuum processing system and piping arrangement according to the present invention.

FIG. 3 is a partially exploded perspective view of one embodiment of a semiconductor vacuum processing machine 20 and vacuum piping arrangement according to the present invention. Vacuum processing system 20 includes a conventional vacuum process chamber 21 that is configured to hold one or more wafers W staged and supported by base 12 for processing. The vacuum processing system 20 may further include a gas supply system 23 for injecting reactant processing gases into vacuum chamber 21, a conventional vacuum pump 24, and vacuum pumping piping 25 fluidly connecting process chamber 21 to vacuum pump 24. Vacuum chamber 21 and vacuum pump 24 may be any suitable commercially available machines that will be readily recognizable to those skilled in the art and may selected to meet the particular requirements of semiconductor fabrication processes to be performed.

Figure 2:
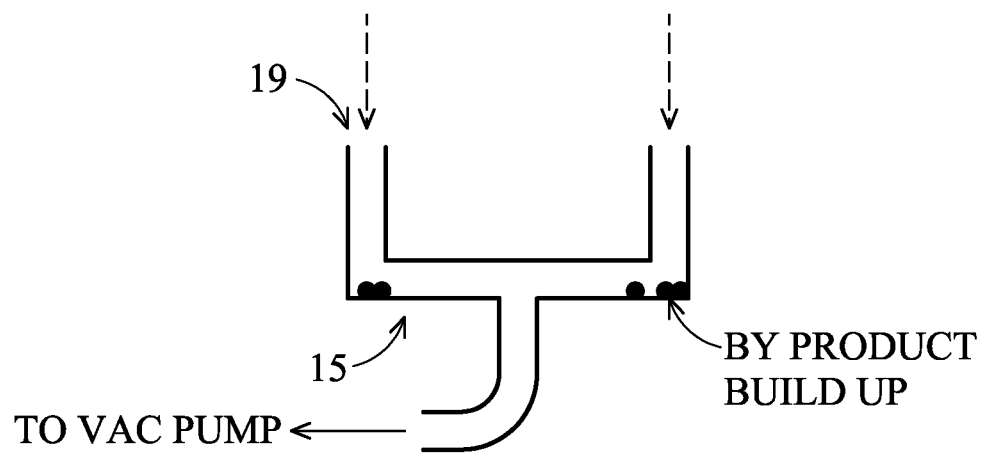
FIG. 2 is a cross-sectional side view showing a portion of the conventional vacuum piping of FIG. 1.

With continuing reference to FIG. 3, vacuum pumping piping 25 is intended to reduce or eliminate the problems associated with prior asymmetric and complicated piping system arrangements as described and shown herein in FIGS. 1-2, including but not limited to process chamber particulate byproduct or powder buildup, pressure and gas flow imbalance, and lower pumping efficiency as previously described herein. In one preferred embodiment, vacuum pumping piping 25 is advantageously configured to provide a simple, symmetrical piping arrangement that preferably also eliminates or minimizes horizontal flow piping sections and reduced flow zones that tend to accumulate the particulate or solid byproducts carrying over from the semiconductor fabrication processes performed in vacuum process chamber 21. This improved symmetrical and simple piping arrangement further advantageously minimizes gas flow and pressure imbalances between different piping branches and improves pumping efficiency, making the system more amenable to processing the next generation 450 mm size wafers.

Figure 4:
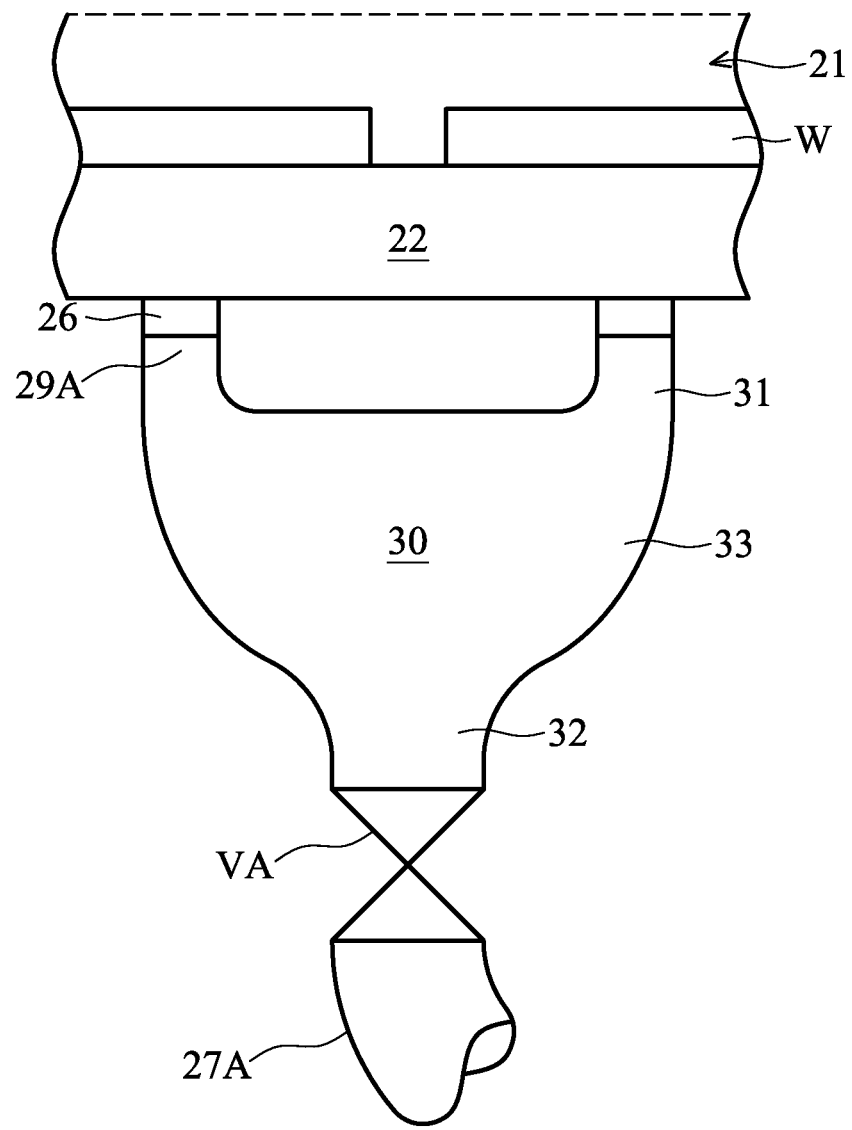
FIG. 4 is a side view showing a bifurcated vacuum piping fitting of the vacuum piping of FIG. 3 fluidly connected to the vacuum chamber.

Referring to FIGS. 3 and 4, vacuum pumping piping 25 in one embodiment may include Piping Branch A and Piping Branch B. Preferably, Piping Branches A and B are substantially symmetrical in configuration and size from piping inlets 29A and 29B coupled to pumping ports 26 on process chamber 21 (see FIG. 4) to the inlet of isolation valve VI proximate to the point where the bifurcated piping converges into a single pipe or line. It will be appreciated that some slight variations in size and configuration may be required in some embodiments to adapt each Piping Branch to physical differences and obstructions resulting from actual installation of the piping. Piping Branch A includes piping inlets 29A, a first specially configured bifurcated fitting such as Y-shaped fitting 30, throttle valve VA, and piping section 27A. In one embodiment, Piping Branch B preferably is similarly configured to Piping Branch A and includes piping inlets 29B, a Y-shaped fitting 30, throttle valve VB, and piping section 27B. Preferably, Piping Branches A and B advantageously do not include any substantially horizontal sections that may act as ledges for accumulating particulate byproduct buildup as found in prior vacuum pumping piping designs.

Referring to FIG. 3, Y-shaped fittings 30 is preferably closely coupled to vacuum chamber 21. Throttle valves VA and VB are preferably closely coupled to Y-shaped fittings 30. These short distances are intended to minimize or eliminate some piping to reduce the potential sites for solid byproduct particles or powder carried from the vacuum chamber 21 to condense and accumulate.

Piping sections 27A and 27B terminate and converge at a second bifurcated fitting such as Y-shaped fitting 28. Y-shaped fitting 28 may be a standard commercially available piping fitting or a special fabricated mitered fitting configured to match the specific size, angles, and requirements for the intended installation.

An isolation valve VI is disposed downstream of Y-shaped fitting 28 and upstream of vacuum pump 24 as shown in FIG. 3. Isolation valve VI may include an automatic valve operator responsive to a signal from system controller 40 to close and open the valve or may be strictly a manually operated valve. Isolation valve Vi is used for maintenance or emergency shutdown procedures to isolate vacuum pump 24 from process chamber 21. Isolation valve VI may be mounted to the inlet of vacuum pump 24 or may be fluidly connected to vacuum pump 24 via a section of piping.

FIG. 4 is a side view of specially configured Y-shaped fitting 30 shown positioned in Piping Branch A and attached to vacuum chamber 21. Y-shaped fitting 30 has a bifurcated inlet arrangement including two inlet sections 31 each defining a respective piping inlet 29A for coupling to pumping ports 26 on vacuum chamber 21, an enlarged mixed flow main portion 33, and a single combined outlet section 32. In one embodiment, outlet section 32 of fitting 30 may attached directly to throttle valve VA or to a short section of piping or spool piece that attaches to valve VA. A similar specially configured Y-shaped fitting 30 is also provided for Piping Branch B in preferred embodiments. Inlet sections 31 and outlet section 32 may have any suitable end preparation known in the art to match pumping ports 26 and valve VA or piping disposed between valve VA and outlet section 32. The type of end preparation used will be dictated by the corresponding end preparation used for pumping ports 26 and valve VA or other piping at the outlet from fitting 30. Preferably, Y-shaped fitting 30 does not include any horizontal flow path portions to prevent accumulation of particulate byproduct buildup carrying over from vacuum chamber 21.

It will be appreciated that in some embodiments contemplated, Y-shaped fitting 30 may be a conventional commercially-available Y-fitting.

Throttle valves VA and VB may be any commercially available valve suitable for use in a vacuum piping system flow and pressure throttling application. Throttle valves VA and VB, regardless of the type or style of valve selected, include a variable flow orifices of a suitable type to regulate the flow through the valve and operating pressures in each respective Piping Branch. Preferably, valves VA and VB in one embodiment include electric valve operators with appropriate electronics that allow flow through the valves and outlet pressures therefrom to be adjusted automatically via electric control signals output from a microprocessor-based system controller 40 shown in FIG. 3, as further described herein. Valves VA and VB may include other conventional appurtenances and auxiliary equipment commonly supplied for such valve applications including limit switches, open/closed position indicators, etc. In some embodiments, throttle valves VA and VB may have pneumatic actuators.

Isolation valve VI may be any commercially available valve suitable for use in a vacuum piping system flow and flow isolation application. Valve VI may be manually operated valve in some embodiments, or alternatively may be electrically or pneumatically operated and capable of remote actuation similar to throttle valves VA and VB via electric control signals output from system controller 40.

A control system according to the present invention will now be described for monitoring and controlling the operation of the vacuum pumping piping 25 system. The control system includes a system controller 40 which will now be described in additional detail with reference to FIGS. 3 and 5.

System controller 40 is preferably a microprocessor-based controller in some embodiments that is operable to receive and generate data and control signals. In one embodiment, system controller 40 preferably is operative to sense and receives discrete pressure signals generated and transmitted from pressure sensors 50, 51, and 52 which measure actual pressures Pa, Pb, and P respectively. Pressure sensors 51 and 52 are preferably each respectively located upstream of throttle valves VA and VB, and more preferably at or near the outlet from specially configured Y-shaped fitting 30 as shown to measure the combined pressure of Piping Branch A or B. Pressure sensor 50 is connected to and measures actual pressure P within vacuum chamber 21. Sensors 50-52 may be any suitable commercially available pressure sensing or monitoring devices that are operable to measure pressure, and then generate and transmit data signals via data communication links 42 to system controller 40 that are indicative of the instantaneous actual measured pressures at each sensor mounting location.

With continuing reference to FIG. 3, in some embodiments, system controller 40 is further electrically linked to the valve operators associated with throttle valves VA and VB via communication links 42. Controller 40 therefore is operable to generate and transmit control signals to throttle valves VA and VB via communication links 42 for adjusting/throttling the position of the variable flow orifice in the valves to regulate pressure and flow through each Piping Branch A and B. System controller 40 may further be electrically linked to isolation valve VI to open/close the valve via control signals similar to throttle valves VA and VB. In other embodiments, isolation valve VI may be a manually-operated valve. In yet other possible embodiments, isolation valve VI may be a throttle valve similar to valves VA, VB in lieu of an on/off type isolation valve. This latter option may be provided where it is desirable to throttle and adjust the entire flow in vacuum pumping piping 25 and vacuum pressure within chamber 21 with a single valve in addition to the capability to adjust pressures in each of the Piping Branches A and B via throttle valves VA and VB.

System controller 40 may be any type of commercially available processor, central processing unit (CPU), microprocessor, microcontroller, or similar computer-like device that incorporates the required control circuitry. Controller 40 preferably includes or is connected to accessible computer-readable storage medium including any suitable type or combination of conventional computer memory such as without limitation read only memory (ROM), random access memory (RAM), flash memory, optical storage devices such as a hard disk drive, etc.

Figure 5:
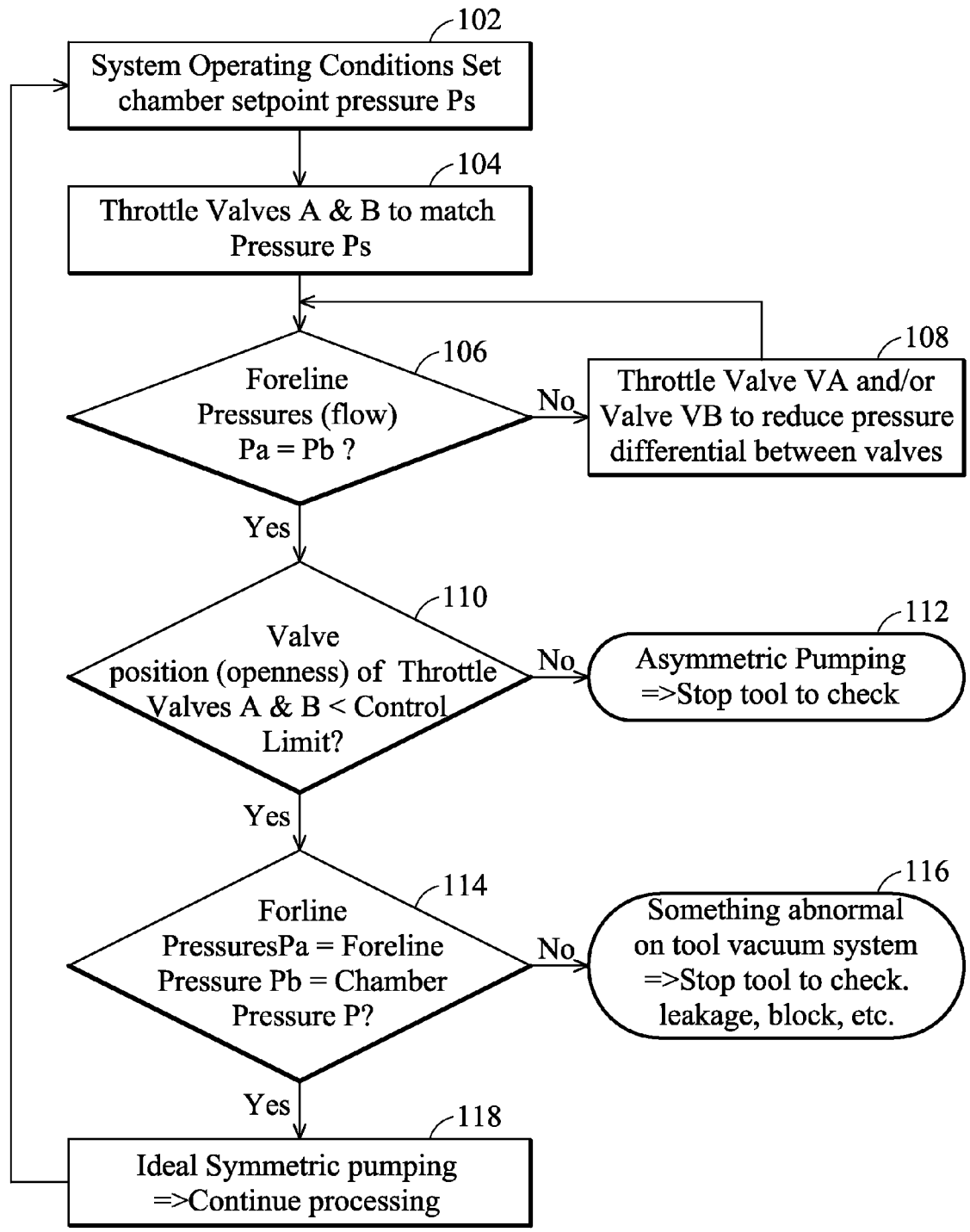
FIG. 5 is a flowchart showing a method and exemplary control logic for operating the vacuum processing system of FIG. 3.

Referring to FIGS. 3 and 5, system controller 40 preferably is programmed with and executes operating instructions or control logic configured to monitor and control the vacuum pumping piping 25 system. System operating pressures Pa, Pb, and P form input signals to the control logic allowing the operation of vacuum pumping piping 25 system to be monitored and controlled. The control logic and various system input baseline operating parameters and control limits or setpoints may be pre-programmed into controller 40 and stored on the computer-readable storage medium. The control logic may be executed by controller 40 in hardware, firmware, software, or any combination thereof. System controller 40 may further preferably includes a conventional user interface 41 such as a video display device (VDD) and control keys allowing operating personnel to program, operate, and interface with the controller.

Data communication links 42 may include without limitation wired, wireless, "on-board" (circuit board) conductors, and combinations thereof in some preferred embodiments.

One preferred method of operating the vacuum pumping piping 25 system will now described with reference to FIGS. 3 and 5. FIG. 5 shows one example of control logic that may be pre-programmed into and implemented by system controller 40 for controlling operation of the vacuum pumping piping 25 system. Control logic routine or process 100 begins in step 102 in which the desired setpoint pressure Ps of vacuum chamber 21 is preprogrammed into a system controller 40. In next step 104, system controller 40 automatically throttles or adjusts valves VA and VB individually until the actual pressure P in vacuum chamber 21 substantially matches the preselected setpoint pressure Ps. Pressure sensor 50 measures the instantaneous actual pressure P within vacuum chamber 21 and transmits a data signals indicative of this measured pressure back to system controller 40. System controller 40 then reads and uses this pressure data to throttle valves VA and VB until the actual measured chamber pressure P substantially matches the desired setpoint pressure Ps.

With continuing reference to FIGS. 3 and 5, control logic process 100 continues in step 106 wherein a test is performed comparing the foreline or upstream pressures Pa and Pb ahead of their respective throttle valves VA and VB. In this step, system controller 40 automatically senses and reads pressures Pa and Pb in Piping Branches A and B. Ideally, the pressures Pa and Pb within each Piping Branch A and B are equal or substantially close within a preprogrammed pressure differential limit previously input into system controller 40 to provide uniform gas flow in each Piping Branch. If a "NO" response is returned indicating that pressure Pa does not match pressure Pb within the prescribed limit, step 108 is implemented in which system controller 40 adjusts the position of the variable flow orifice in each throttle valve VA, VB, or in both until the pressure differential between pressures Pa and Pb are back within the control limit. Preferably, the throttle valves have electronic position indicators for the variable flow orifice which indicate the degree to which the orifice is either closed or opened. These position indicators are therefore operative to sense the orifice position and generate a signal which is transmitted to system controller 40 indicative of the identified position. Once a "YES" response is returned in step 106, control passes to step 110.

In step 110, a system check or test is performed to verify that the degree of openness of the variable flow orifices in each throttle valve VA and VB are less than a preprogrammed valve position control limit previously input into system controller 40. Accordingly, the valve operators and their associated electronic circuitry for valves VA and VB preferably include position indicators that are operable to detect each valve's position (meaning the degree of openness of the valve orifice), and then generate a signal indicative of the same which is transmitted to system controller 40 via data communication link 42. In other embodiments, separate electronic valve position indicators and circuitry may be provided for the same purpose. If a "YES" response is returned, control passes to step 114. Alternatively, if a "NO" is returned, asymmetric pumping and flow is occurring which may possibly indicate a leak in the vacuum piping system or particulate byproduct blockages/buildup in one of the Piping Branches A or B upstream of throttle valves VA and VB. Step 112 is therefore performed in which system controller 40 generates a signal to stop the vacuum processing system 20 machine to allow for inspection, repair, and/or maintenance of the vacuum processing system 20 and/or vacuum pumping piping 25.

With continuing reference to FIGS. 3 and 5, assuming a "YES" response is returned in step 110, control then passes to step 114 in which an additional system check or test is performed. In step 114, system controller 40 reads and compares the instantaneous actual pressures Pa, Pb, and P to determine if they are the substantially the same within a preprogrammed control limit. The pressure information is transmitted to system controller 40 by pressure sensors 50, 51, and 52 as described herein over data communication links 42. System controller 40 may apply appropriate preprogrammed correction factors to the measured pressures to compensate for the fact that the pressure P measured within vacuum chamber 21 may be slightly different than pressures Pa and Pb measured in Piping Branches A and B due to some pressure drop occurring through the piping to the point of measurement. If the pressures Pa, Pb, and P (optionally corrected as needed) are substantially the same (i.e. a "YES" is returned) being within the preprogrammed control limit, control passes to step 118 in which operation of the vacuum processing system 20 continues.

Alternatively, if in step 114 pressures Pa, Pb, and P are not the same (i.e. a "NO" is returned) with the control limit, an abnormal operating condition is occurring which may be indicative of a leak in the vacuum piping system, vacuum chamber 21, particulate byproduct blockages/buildup in the piping, or another reasons. Accordingly, step 118 is implemented by system controller 40 in which the vacuum processing system 20 is shut down to allow for inspection and repair or maintenance as required.

System controller 40 repeats the foregoing control logic process 200 steps to monitor and protect vacuum processing system 20 and the quality of the wafers W produced therein. In some embodiments, control logic process 200 may run continuously. In other embodiments, control logic process 200 may be implemented periodically on a recurring basis.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes and/or control logic as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A vacuum system for semiconductor fabrication comprising:
   a vacuum chamber for performing a semiconductor fabrication process;
   a vacuum source;
   a piping system fluidly connecting the vacuum chamber to the vacuum source,
      wherein the piping system is configured without any horizontal flow path sections of piping and includes a first piping branch and a second piping branch,
      wherein the first piping branch includes a first bifurcated fitting, the second piping branch includes a second bifurcated fitting and the first and second piping branches being fluidly connected to the vacuum source by a third bifurcated fitting, each of the first, second and third bifurcated fittings having two inlet sections and a combined outlet section and configured without a horizontal flow path section,
      wherein each of the first and second bifurcated fittings being fluidly connected to two pumping ports on the vacuum chamber and the two inlet sections of the third bifurcated fitting are each fluidly connected to one of the outlet sections of the first and second bifurcated fittings;
   a first throttle valve fluidly connecting the outlet section of the first bifurcated fitting to one of the inlet sections of the third bifurcated fitting;
   a second throttle valve fluidly connecting the outlet section of the second bifurcated fitting to one of the inlet sections of the third bifurcated fitting; and
   an isolation valve fluidly connecting the outlet section of the third bifurcated fitting to the vacuum source, each of the throttle valves being independently controllable and operable to adjust the pressure in each piping branch.

2. The system of claim 1, wherein the first and second piping branches have a symmetrical configuration with respect to the vacuum source.

3. The system of claim 1, wherein the first and second piping branches have substantially the same configuration.

4. A vacuum control system for a semiconductor fabrication machine comprising:
   a vacuum chamber for performing a semiconductor fabrication process, the chamber including a chamber pressure sensor operable to measure pressure within the chamber and transmit a signal indicative of the measured chamber pressure;
   a vacuum source;
   a first piping branch comprising a first bifurcated fitting, a first throttle valve, and a first pressure sensor, wherein said first piping branch is fluidly connected to two pumping ports on the vacuum chamber by the first bifurcated fitting and said first pressure sensor being operable to measure pressure within the first piping branch and transmit a signal indicative of the measured first branch pressure;
   a second piping branch comprising a second bifurcated fitting, a second throttle valve, and a second pressure sensor, wherein said second piping branch is fluidly connected to two pumping ports on the vacuum chamber by the second bifucated fitting and said second pressure sensor being operable to measure pressure within the second piping branch and transmit a signal indicative of the measured second branch pressure;

a third bifurcated fitting fluidly connecting the first and second piping branches to the vacuum source, wherein the first, second, and third bifurcated fittings are configured without any horizontal flow path sections;

an isolation valve disposed between the third bifurcated fitting and the vacuum source; and a system controller receiving pressure signals from the chamber pressure sensor, first piping branch pressure sensor, and second piping branch pressure sensor, the controller executing control logic configured to:

compare the measured pressure from the first and second piping branch pressure sensors; and throttle the first or second throttle valves to balance the pressure in each piping branch.

5. The system of claim 4, wherein the control logic is further configured to sense the operating position of the first and second throttle valves, compare the positions of the first and second valve to a control limit, and stop the fabrication machine if the positions of the first or second control valve exceed the control limit.

6. The system of claim 4, wherein the control logic is further configured compare the chamber pressure to the first branch pressure and second branch pressure, and stop the fabrication machine if the first or second branch pressure is not substantially equal to the chamber pressure within a predefined control limit.

7. The system of claim 4, wherein the control logic is stored on computer readable medium accessible to the controller.

8. The system of claim 7, wherein the controller is operable to open or close the isolation valve.

9. The system of claim 4, further comprising an isolation valve disposed upstream of the vacuum source and in fluid communication with the first and second piping branches.

10. The system of claim 4, wherein the isolation valve further comprising an automatic valve operator responsive to a signal from the system controller to open and close the isolation valve.

* * * * *